United States Patent [19]

Black

[11] 4,344,386

[45] Aug. 17, 1982

[54] HEAT TRANSFER EQUIPMENT AND METHOD

[76] Inventor: Robert B. Black, 2925 Denver St., Corpus Christi, Tex. 78404

[21] Appl. No.: 184,655

[22] Filed: Sep. 5, 1980

Related U.S. Application Data

[60] Continuation-in-part of Ser. No. 46,240, Jun. 7, 1979, Pat. No. 4,271,789, and a continuation-in-part of Ser. No. 58,779, Jul. 19, 1979, abandoned, said Ser. No. 46,240, is a continuation-in-part of Ser. No. 813,667, Jul. 7, 1977, Pat. No. 4,197,831, which is a continuation of Ser. No. 620,327, Oct. 7, 1975, abandoned, which is a continuation-in-part of Ser. No. 462,094, Apr. 18, 1974, Pat. No. 4,025,291, which is a division of Ser. No. 192,262, Oct. 26, 1971, Pat. No. 3,844,270, said Ser. No. 58,779, is a continuation-in-part of Ser. No. 794,044, May 5, 1977, abandoned, which is a division of Ser. No. 568,699, Apr. 16, 1975, abandoned, which is a division of Ser. No. 369,084, Jun. 11, 1973, abandoned.

[51] Int. Cl.³ .............................................. F22B 5/02
[52] U.S. Cl. ...................................... 122/19; 122/14; 122/18; 122/236; 126/350 R

[58] Field of Search ............... 122/14, 15, 16, 17, 122/18, 19, 235 R, 406 R, 236, 23, 25; 126/350 R, 361

[56] References Cited

U.S. PATENT DOCUMENTS

| | | | |
|---|---|---|---|
| 2,203,370 | 6/1940 | Taylor | 122/235 R |
| 3,534,712 | 10/1970 | Reynolds | 122/235 R |
| 3,602,200 | 8/1971 | Evans et al. | 122/406 R |
| 3,789,805 | 2/1974 | Williams | 122/235 R |
| 4,055,152 | 10/1977 | Vidaleng | 122/235 R |
| 4,127,085 | 11/1978 | Katz et al. | 122/18 |

*Primary Examiner*—Edward G. Favors
*Attorney, Agent, or Firm*—Synnestvedt & Lechner

[57] ABSTRACT

A system for the conversion of the potential energy of hydrocarbon fuels to heat, the system being particularly adapted to the use of the available heat in the heating of a fluid, especially water. The system includes a special form of heat transfer device by which the available heat, particularly of natural gas, may be transferred to a water supply in a heat exchange device of special construction.

10 Claims, 3 Drawing Figures

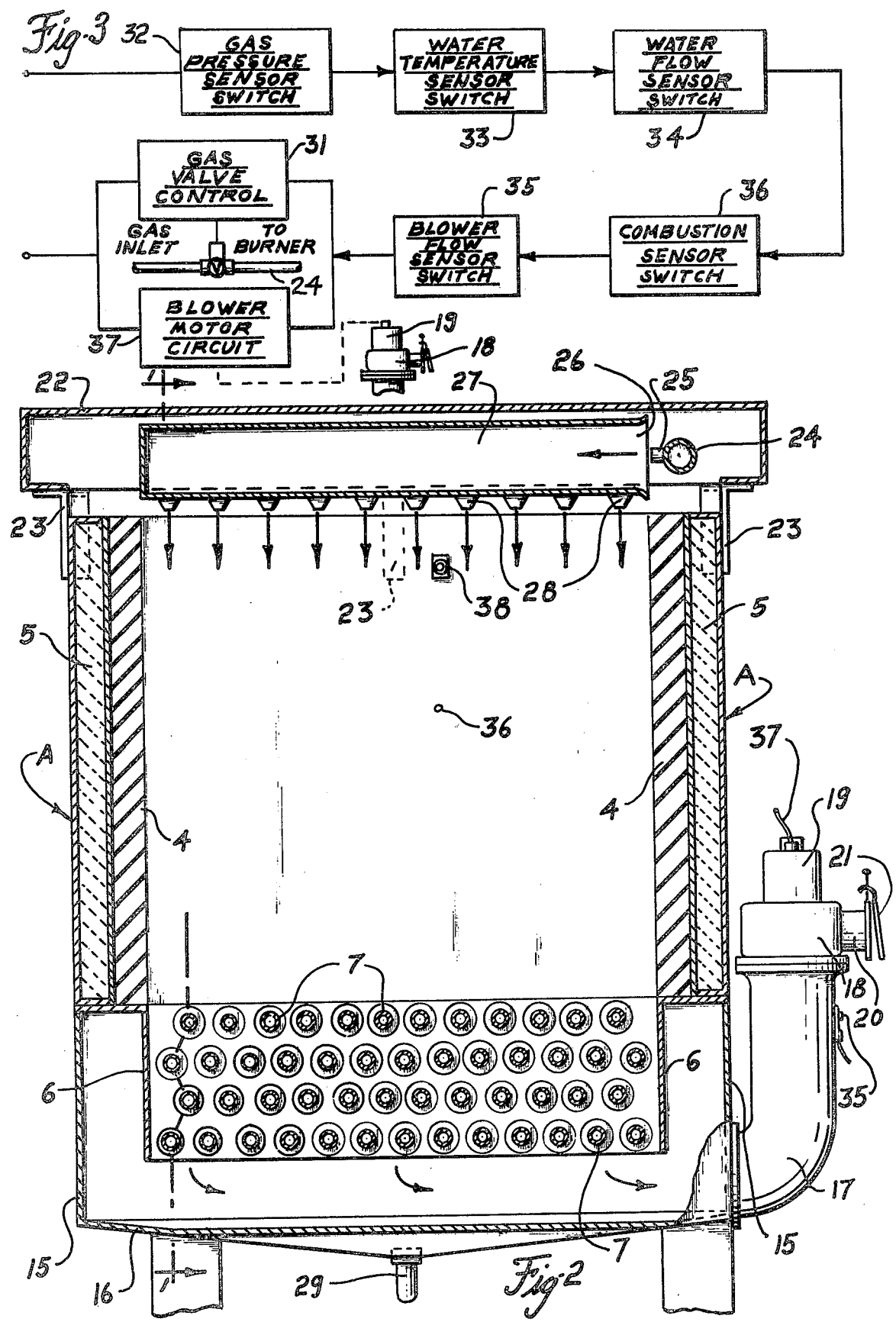

HEAT TRANSFER EQUIPMENT AND METHOD

CROSS REFERENCE

The present application is a continuation-in-part of my application Ser. No. 046,240, filed June 7, 1979, and issued June 9, 1981 as U.S. Pat. No. 4,271,789, which is a continuation-in-part of my application Ser. No. 813,667, filed July 7, 1977, and issued Apr. 15, 1980, as U.S. Pat. No. 4,197,831, which in turn is a continuation of application Ser. No. 620,327, filed Oct. 7, 1975, now abandoned, which in turn is a Continuation-in-Part of application Ser. No. 462,094, filed Apr. 18, 1974, and issued May 24, 1977, as U.S. Pat. No. 4,025,291, which in its turn is a division of application Ser. No. 192,262, filed Oct. 26, 1971, and issued Oct. 29, 1974, as U.S. Pat. No. 3,844,270. The present application is also a continuation-in-part of my application Ser. No. 058,779, filed July 19, 1979, now abandoned, which is a continuation-in-part of application Ser. No. 794,044, filed May 5, 1977, now abandoned, which is a division of application Ser. No. 568,699, filed Apr. 16, 1975, now abandoned, which in its turn is a Division of application Ser. No. 369,084, filed June 11, 1973, now abandoned.

Certain aspects of the subject matter are also related to the subject matter of my U.S. Pat. No. 3,699,079, which was filed Aug. 6, 1970, and which issued June 13, 1972, as U.S. Pat. No. 3,669,079.

BACKGROUND AND STATEMENT OF INVENTION AND OBJECTS

All of my prior applications and patents above identified disclose certain features of energy conversion systems adapted to increase the efficiency of energy conversion, particularly the efficiency of conversion of energy of gaseous fuels such as natural gas; and all of said prior applications and patents disclose certain heat exchanger devices adapted to increase the efficiency of heat transfer from the products of combustion of petroleum fuels, especially natural gas, to fluids, particularly liquids such as water. In all of said prior applications and patents heat exchanger devices are disclosed and such devices are arranged to provide for indirect heat transfer from the products of combustion to the liquid or other fluid to be heated by means of heat exchangers in which conditions are established providing for cooling of the combustion products to a temperature below the dew point, in order to utilize the large amount of BTU's released upon condensation of the water vapor present in the products of combustion.

The present application also contemplates highly effective recovery of the BTU's by establishing conditions which will reduce the temperature of the products of combustion to a temperature below the dew point, before discharge of the gaseous products of combustion. The present invention, however, is concerned with a combination of a number of improvements and features adapted to obtain a high efficiency while at the same time, making possible simplification of the heat exchange equipment used, as herein disclosed, reducing production costs and time, together with the elimination of certain production problems.

Before proceeding with more detailed description of the structural embodiments and features and advantages of the operation of systems according to the present invention, it is here first pointed out that while certain aspects of the invention are adaptable to use with a variety of fuels, the invention is especially adapted to the use of flammable gases, particularly natural gas, but others may be used including methane, the L.P.G. fuels, synthetic gases or even hydrogen. Moreover, while the equipment and heat exchangers provided according to the invention are adapted to the heating of a variety of fluids, either liquid or gaseous, the invention is particularly well suited to the transfer of the available BTU's of the products of combustion to liquids, solar fluids and especially to the heating of water. For these reasons, the description given hereinafter refers to the utilization of the available BTU's in natural gas in the heating of water, but it is to be understood that these references are not to be construed in a limited sense.

One of the important objects of the present invention is the provision of a water heater employing a special combination of features including a combustion chamber and heat transfer passages through which the hot combustion gases or products of combustion flow in a downward direction, while at the same time, the conditions of heat transfer are established so as to reduce the temperature of the products of combustion to or below the dew point, provision further being made for downward delivery under the action of gravity of the condensate formed, thereby avoiding the necessity for the condensate and the flue gases to flow in the flue gas passages in opposite directions to each other. In accomplishing the foregoing, the present invention preferably utilizes a blower effecting forced downward flow of the products of combustion from the combustion chamber through flue gas passages.

It is also contemplated according to the present invention to employ tubes for flow of the fluid to which the heat is being transferred in the equipment; and preferably, in accordance with the present invention, those tubes comprise externally finned tubes, desirably arranged in groups or superimposed planes, with appropriate headers providing for circulation of the fluid being heated in counterflow relation to the direction of flow of the gases.

According to the invention, it is contemplated that the heat exchanger be arranged to provide for reduction in the temperature of the products of combustion down to a point substantially below the dew point. This is desirable in order to recover the latent heat of condensation, but the development of the condensate results in the presence of certain acids having corrosive influence with respect to common types of metals employed in heat exchangers. In view of this, the invention contemplates employing highly acid-resistant metals or surface treating or coating of the metals to impart high acid resistance.

In the preferred embodiment according to the present invention, the heat exchange device comprises means defining a vertically extended flow space for combustion products, with a gaseous fuel supply and means for effecting combustion of gaseous fuel and air in the region of an upper portion of said flow space and for delivery of the combustion products downward from the upper portion of said flow space. In a typical embodiment provided for the heating of water, the water flow spaces are preferably arranged in the region at the lower portion of the gas flow space and desirably comprise a plurality of superimposed layers of finned water tubes; and an exhaust manifold and sump is provided below the finned tubes. A blower is also provided for effecting downward flow of the products of combustion through the flow space for the combustion gases and between the finned tubes, into the exhaust manifold and sump, for discharge therefrom.

This downward flow of the combustion gases, together with the provision for cooling of the gases to a temperature below the dew point, is of importance because it provides for downward drainage of the condensate from in the same direction as the downward flow of the combustion gases. This system avoids the necessity for gas and condensate flow taking place in the same passages in opposite directions.

Still further, the invention contemplates means responsive to increase in the temperature of the water above a predetermined value to shut off the blower and also shut off the gaseous fuel supply.

The invention also provides a novel form of gas and air admission means associated with the combustion chamber and providing increased efficiency in the intermixture of the gas and air being admitted into the combustion chamber.

The invention also contemplates a system of automatic controls of novel form, as will be pointed out more fully hereinafter.

Still further, the invention contemplates the employment of a novel form of automatic gas discharge damper which is particularly adapted for use in combination with the downward flow of the flue gases as above described, and serves to prevent convection induced upward flow or draft, resulting in waste of BTU's.

How the foregoing objects and advantages are attained, together with others which will be more fully developed hereinafter, will be more fully apparent from the following description referring to the accompanying drawings.

BRIEF DESCRIPTION OF DRAWINGS

FIG. 2 is a vertical sectional view of the heat exchanger shown in FIG. 1, FIG. 2 being taken as indicated by the section line 2—2 on FIG. 1; and FIG. 3 is a diagrammatic view of a control system preferably associated with the equipment as shown in FIGS. 1 and 2.

DETAILED DESCRIPTION OF THE DRAWINGS

Figure 1:
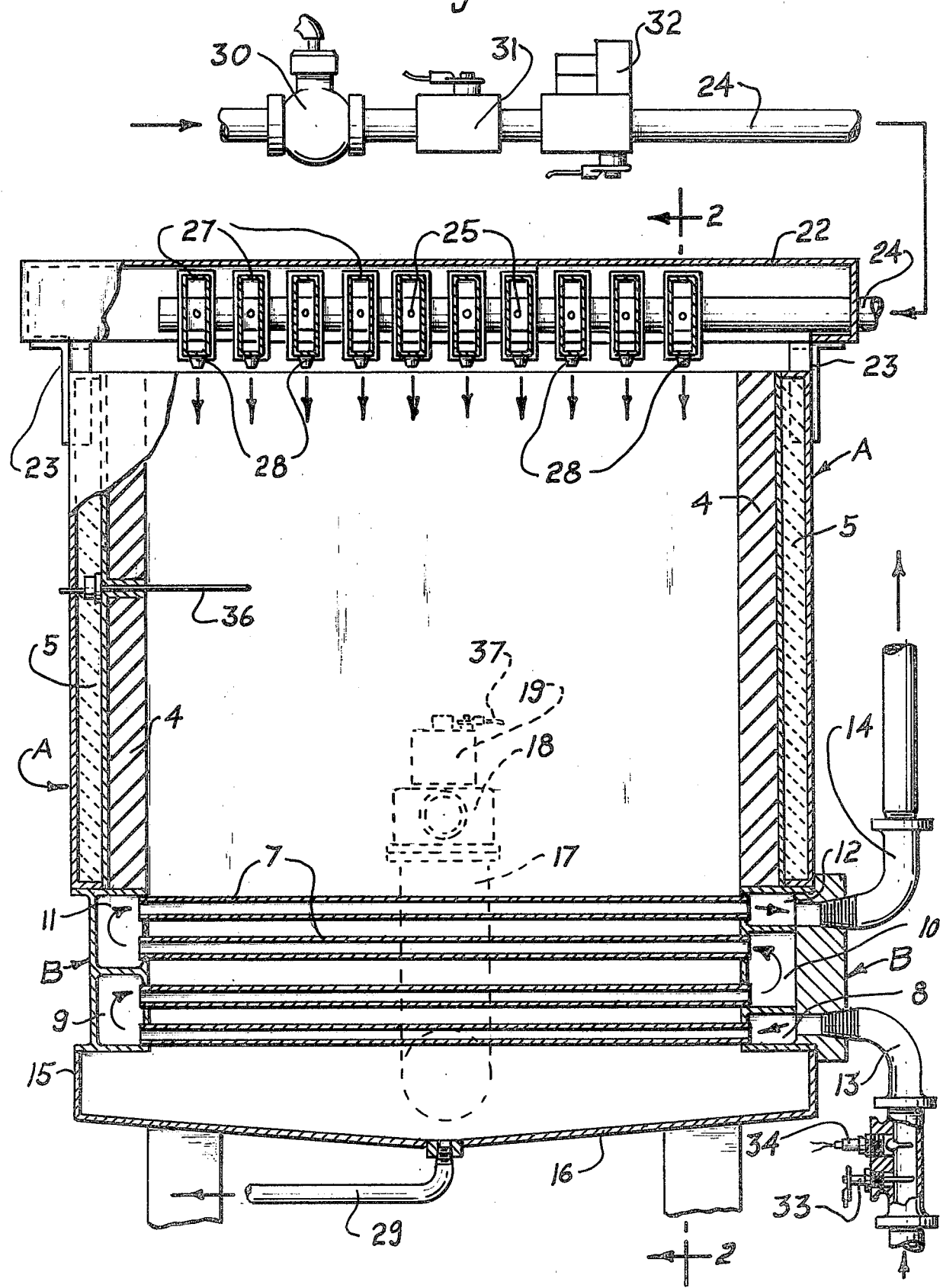
FIG. 1 is a vertical sectional view through a water heater employing the principles according to the present invention, this heater being suitable for many purposes but being particularly adapted to the heating of water in swimming pools and FIG. 1 being taken as indicated on the section line 1—1 on FIG. 2.

In considering the specific embodiment herein disclosed, it is first pointed out that the general arrangement and orientation of the equipment is such as to provide for downward flow of combustion products from a combustion chamber into spaces between water tubes (preferably finned) and thence into an exhaust manifold and sump having a gas discharge duct; and thus, the common prior art reliance upon "natural draft" for the flow of products of combustion from a combustion chamber is not followed. In contrast, a blower or circulation fan is employed in order to establish downward gas flow and ultimately discharge of the products of combustion from the region below the water tubes.

As seen in FIGS. 1 and 2, the heat exchanger, there shown by way of example, comprises upright walls, generally indicated at A, defining a rectangular box-like structure enclosing a combustion chamber into which fuel and air are introduced. Metal sheets are preferably embodied in the walls and arranged to support an inner refractory layer 4 and an outer insulation layer 5. The refractory layer 4 may comprise any suitable ceramic type materials and the insulation 5 may desirably comprise fibrous material, such as rock wool, or glass fiber insulating materials of known types. For the refractory layer 4, a material having a high melting point is desirable, for instance, a volcanic rock or glass, which primarily comprises fused quartz. Materials of this type have a very high melting point and good refractory properties.

Arranged toward the bottom of the upright walls A are manifold structures, generally indicated at B—B, toward one pair of opposite sides of the unit, and also walls 6—6 toward the other pair of opposite sides of the unit. A multiplicity of water tubes are arranged in the rectangular space between the headers B—B and walls 6—6, these tubes being individually indicated at 7.

As seen in FIGS. 1 and 2, the tubes are distributed in a plurality of spaced superimposed planes; and the headers B—B are provided with header chambers, including an inlet chamber 8, with which the adjacent ends of the tubes in the lowermost layer communicate. A header chamber 9 interconnects the opposite ends of the lowermost layer of tubes with the adjacent ends of the next superimposed layer of tubes. A header chamber 10 interconnects the adjacent ends of the second and third superimposed layers of tubes at the inlet side of the system. A similar chamber 11 interconnects the ends of the third and fourth superimposed layers of tubes, as indicated at the left in FIG. 1; and an outlet header chamber 12 communicates with the discharge ends of the uppermost layer of tubes.

With a water inlet connection, such as indicated at 13 in FIG. 1, and an outlet connection as indicated at 14, the arrangement of the headers provides for serial flow of the fluid being heated (water in the specific example illustrated) sequentially through the tubes of each superimposed layer, beginning with the lowermost layer and ending with the uppermost layer.

The tubes 7, as indicated, are finned tubes in order to provide large heat transfer surface area between the combustion gases and the water in the tubes as the gases flow downwardly from the combustion chamber between the tubes. With the tubes extended horizontally, the fins lie in vertical planes generally paralleling the downward flow path of the combustion gases.

Surrounding and below the groups of tubes in the lower portion of the equipment, side walls 15 and a bottom wall 16, which functions as a sump, define an exhaust manifold for receiving the products of combustion and condensed combustion water vapor, after flow of such products downwardly between the tubes. This exhaust manifold has a discharge opening with which the exhaust duct 17 communicates, the exhaust duct having a blower 18 associated therewith, driven by a motor 19. The discharge 20 from the blower preferably has an automatically closing damper 21 associated therewith of the kind more fully disclosed in the parent application Ser. No. 046,240, above referred to.

At the top of the side walls A, a roof structure 22 is provided, being supported on the side walls by means of spaced brackets 23. The roof structure is supported in a position providing a substantial air intake gap between the upper edges of the side walls and the roof structure, and the roof structure accommodates gas inlet and distribution means are described just below. Such a roof structure is especially effective in providing protection for the equipment when used in an outdoor installation.

A gas supply connection 24, for instance, a connection for supplying natural gas, extends along one side of and within the roof structure, this supply connection being provided with a plurality of nozzles, such as indicated at 25, at spaced intervals across the width of the box-like structure (see FIG. 1). Each one of the nozzles 25 is directed into the open end 26 of a Venturi device 27 extended across the top of the rectangular combustion chamber, the Venturi devices being spaced from each other, as is shown in FIG. 1, and each such Venturi device having a series of spaced downwardly directed burner tips 28.

Because of this gas and air inlet system, the burner tips 28 each deliver a mixture of the gas and air downwardly into the upper region of the combustion chamber; and this mixture is further diluted with additional secondary air entering the system between the Venturi devices 27 and around the top edges of the combustion chamber, in consequence of the free entry of air in the gap between the roof structure and the upper edges of the side walls.

This action is made possible by the action of the blower 18 in the exhaust duct.

In operation, it will be seen that the combustion products flow in a downward direction from the upper portion of the combustion chamber and flow downwardly between the tubes in the lower region of the device, the gases being collected in the exhaust manifold defined by walls 15 and 16 and then being withdrawn through the exhaust duct 17. The finned tubes 7, being generally horizontally extended, result in positioning of the fins themselves in planes generally paralleling the path of downward flow of the exhaust products; and with the conditions of operation and the heat exchange surface area appropriately proportioned, it is contemplated that the products of combustion be decreased in temperature to a value below the dew point of the water vapor normally present in the products of combustion resulting from the burning of natural gas. This reduction in temperature below the dew point results in recovery of the latent heat of condensation and also in the development of the condensate, which is delivered into the exhaust manifold 16 at the bottom and which is appropriately withdrawn by means of a condensate drain, such as indicated at 29.

Because of the downward flow of the combustion products, instead of the upward flow, as commonly employed in devices relying upon natural draft for the purpose of discharging the flue gases, it is desirable that means be provided in order to restrict or prevent reverse or upward flow of gases or air through the equipment; and for this purpose, provision is made for automatic shut-off of the gas supply, and preferably also for concurrent shut-off of the blower motor in the event of the occurrence of certain conditions in the operation of the equipment. A control system for this purpose is diagrammatically illustrated in FIG. 3; but before referring specifically to the overall control system, attention is first directed to certain of the devices and sensors associated with the equipment. The gas supply line 24, as shown in FIG. 1, is provided with a manual shut-off valve 30 and also with an electric solenoid-operated shut-off valve 31; and, if desired, also with a gas pressure sensor switch 32; and as will be explained herebelow, the solenoid-operated shut-off valve 31 is adapted to be automatically tripped to shut off the gas supply under various conditions to be referred to. The water supply line 13 is provided with two sensors, namely, an inlet water temperature sensor switch 33, and a water flow sensor switch 34. Still further, the exhaust duct 17 is provided with a blower flow or exhaust flow sensor switch 35. A combustion sensor switch 36 is also provided, including the temperature probe projecting into the combustion chamber, as is indicated in FIG. 1.

All of the sensor switches, 32 to 36 inclusive, are connected in series with both the gas control valve 31, and the blower motor circuit, the connection for which is indicated in FIG. 2 at 37.

In view of the foregoing control system, which is also disclosed in parent application Ser. No. 046,240 above identified, the supply of gas will be terminated in any one of the following circumstances, i.e., increase of water temperature above a predetermined point, excessive decrease or loss in water flow, failure of combustion, failure of exhaust gas flow in the exhaust duct, and even in the event of abnormal loss of gas pressure. Because of the control system, as shown in FIG. 3, any of these events will also terminate the operation of the blower motor.

By employing an automatically closing damper, such as indicated at 21 and described more fully in the parent application Ser. No. 046,240 above identified, during those intervals when the heater (and blower motor) is not operating the damper 21 will close, thereby decreasing undesired reverse flow of air through the system under the influence of natural draft.

Within the combustion chamber, a gas ignitor 38, preferably of spark type, is provided. This ignitor functions in known manner to open the control circuit after an interval of a few seconds, (usually from about 2 to 8 seconds) after operation of the ignitor, in the event that combustion has not been established.

This control system is particularly desirable in the type of arrangement disclosed wherein the gas flow is downward from the combustion chamber between the water tubes, it being noted that the blower is relied upon for the desired direction of gas circulation which would not occur and would indeed be reversed in the event of failure of the motor or blockage of the flow path.

The control system as referred to above is well suited to the use of the equipment for the purpose of warming the water of swimming pools; and in this use, the water supply line 13 would receive water from the swimming pool and the water outlet line 14 would return the water to the swimming pool, for instance, under the influence of a circulating pump (not shown).

With respect to the finned tubes 7, it is pointed out that these tubes may be fabricated in any of the well known ways in which finned tubes may be made; but preferably, the metal employed is integral with the tubing itself, and is corrosion-resistant so that it would not be adversely affected by the acidity of the condensate during operation of the heat exchanger under conditions in which the combustion gases are decreased in temperature to a value below the dew point. Tubes and fins (preferably integral), may be made of copper, but other highly acid-resistant metals may desirably be employed, for instance, Admiralty brass, stainless steel, monel metal or aluminized steel. An example of an appropriate metal for this purpose is Admiralty brass of type B, as follows:

| Copper | 70. to 73.% |
| --- | --- |
| Tin | .9 to 1.2% |
| Lead | 0.07% max |
| Iron | 0.06% max |
| Zinc | Remainder |
| Arsenic | 0.02 to 0.10% |

Another highly corrosion resistant metal is Carpenter alloy steel-20cb-3, as follows:

| Carbon | 0.06% max |
| --- | --- |
| Manganese | 2.% max |
| Phosphorous | 0.035% max |
| Sulfur | 0.035% max |
| Silicon | 1.% max |
| Chromium | 19./21% |
| Nickel | 32.5/35.% |
| Molybdenum | 2./3.% |
| Copper | 3./4.% |
| Columbium + Tantalum | 8 × C min/1.% man |
| Iron | Balance |

As an alternative, a high degree of corrosion resistance can be developed by employing a thin coating of silicone resin materials on metals having lower corrosion resistance. For instance, some types of rubber-silicone can be employed for this purpose, or certain copper protecting coatings can be applied to the other metals. Coatings of this kind are not porous and are virtually completely inert to all acids; and in thin layers they do not result in any significant impairment of heat transfer. In the use of aluminized steel, the surfaces of the steel are heated in a bath of pure molten aluminum containing approximately 6% silicon. This can be effectively done in a nitrogen atmosphere containing about 5-15% hydrogen.

Low temperature surface areas (below the dew point) may also be protected by spray coating with certain of the silicone rubber materials as produced by General Electric Co., by one of the family of polyurethanes or by a highly inert adhesive material known as Solarcoat, developed for use in Aerospace activities, for instance to protect certain missile components. For better thermal conductivity, these materials may be aluminum "Filled". These materials provide excellent protection against corrosion of the metal surface to which it is bonded. The coating thickness is preferably limited to approximately two mils.

As an example of such coating materials, reference is made to Polythane-(CP-500). CP-500 is a polyester, epoxyized, urethane, nylon-linked coating that exhibits extremely good resistance to acids, hydro-carbons, chemicals, infrared rays, salt water and virtually any other substance normally associated with corrosive environments.

CONCLUSION

Although the equipment may be used in a number of ways, it is contemplated that for many purposes, the conditions of operation, including the flow rate of the water through the system and also the flow rate of the gases through the system, as well as various temperature factors, be established in ranges providing for cooling of the flue gases below the dew point prior to discharge from the exhaust manifold. This results in conversion of the water vapor to liquid form and in the utilization of the significant amount of latent heat of condensation. It is important in the system just described that the gas flows downwardly in the combustion chamber and between the tubes, because of the development of the condensate. Such condensate will flow downwardly by gravity between and on the outside surfaces of the water tubes and may thus be conveniently discharged at the bottom, which is in distinct contrast to various prior arrangements including my prior U.S. Pat. No. 3,669,079 in which the gas flow is directed upwardly from a combustion chamber located below the water heating surfaces and in which, therefore, condensate discharging downwardly by gravity from the flue passages would enter the combustion chamber.

It will be seen therefore that there are highly advantageous interrelationships between various features of the arrangement herein disclosed, including the upper location of the combustion chamber, the downward flow of the gases and including the provision for flow of the gases through, between and over the fins of the water tubes, and the upward flow of water in counterflow relationship to flow of combustion products.

Because of the high and still increasing cost of fuels, the increased efficiency (waste decrease) resulting from low stack or flue gas temperature is an important advantage of the system disclosed.

In connection with the operation of heat exchangers of the kind herein disclosed, several important factors are pointed out, as follows.

First, the combustion of a typical natural gas develops a substantial quantity of water vapor. Where the combustion gases are cooled to a temperature below the dew point, one pound of a typical natural gas produces approximately 2.25 lbs. of water condensate; and this large amount represents a very high quantity of available BTU's which, with most equipment, is completely wasted, because the gases or vapor products of combustion are discharged to atmosphere at temperatures well above the dew point. In a typical case, the BTU value recovered by virtue of condensation of the water vapor in the products of combustion may be as high as 970 BTU's per pound of condensate, or 2180 BTU's per pound of natural gas. This gain in efficiency may be in the range of 11% to 12%, resulting in a reduction in fuel waste in excess of 10%.

Still another advantageous feature of Applicant's equipment when operated in a manner to reduce the temperature of the products of combustion below the dew point before discharge of the gas to the atmosphere, is that such low temperatures, for instance 85° to 95° F., virtually eliminate fire hazard, even where the gases are delivered to the atmosphere through the wall of a house or other building.

In connection with the references herein to the dew point, it is to be kept in mind that the dew point will vary with different fuel gases. Some natural gases, containing little if any sulfur compounds, have a dew point equivalent to that of substantially uncontaminated water, i.e., usually well below the boiling point, even down to about 120°-140° F. On the other hand, with gases containing substantial amounts of contaminants, particularly sulfur compounds, the dew point is substantially higher, usually well above the boiling point of water, for instance, in the neighborhood of 250°-300° F. In either event, i.e., with either type of gaseous fuel, it is contemplated for maximum recovery of BTU's to effect heat transfer sufficiently to bring the temperature of the combustion products down to a temperature below the dew point.

I claim:

1. Heat transfer equipment comprising a combustion chamber, means for introducing a mixture of gaseous fuel and air into an upper region of the combustion chamber, a group of spaced externally finned tubes in a lower region of the combustion chamber and being upwardly exposed to the combustion chamber substantially throughout the length of the tubes, and the tubes having header means providing for flow of a fluid to be heated through the tubes, an exhaust manifold below the tubes for receiving gaseous products of combustion delivered downwardly between the tubes substantially throughout the length of the tubes of said group, and the exhaust manifold having a discharge opening for delivery of gaseous products of combustion, and a blower for establishing a flow of the mixture of fuel and air in a path extended downwardly through the combustion chamber and in a direction downwardly between the tubes substantially throughout the length thereof, the blower providing for delivery of products of combustion downwardly through the spaces between the tubes and into the manifold, the tubes being extended transversely of the path of flow of the products of combustion with the tube fins lying in planes generally paralleling said path of flow substantially throughout the length of the tubes.

2. Equipment as defined in claim 1 in which the effective heat transfer area of the tubes, the rate of fluid flow through the tubes and the rate of flow of the products of combustion established by said blower are proportioned to provide for temperature drop of the products of combustion below the dew point with consequent formation of condensate, and a condensate drain associated with the manifold below the tubes.

3. Equipment as defined in claim 1 in which the means for introducing the mixture of gaseous fuel and air comprises a fuel manifold having a series of fuel discharge orifices, and a series of elongated side-by-side fuel distributing ducts positioned in the upper region of the combustion chamber and each having an air inlet opening positioned to receive fuel from one of said orifices, each duct further having a series of downwardly directed burner tips for delivering fuel-air mixture from each duct into the combustion chamber.

4. Equipment as defined in claim 3 in which the air inlet of each duct communicates with the ambient atmosphere.

5. Equipment as defined in claim 3 in which the upper region of the combustion chamber is provided with air inlet means independent of said ducts and responsive to the action of said blower to introduce air into the upper region of the combustion chamber.

6. Equipment as defined in claim 1 in which the exhaust manifold is provided with an exhaust duct, and in which the blower is associated with the exhaust duct.

7. Equipment as defined in claim 1 in which the finned tubes are arranged in a bundle having a plurality of superimposed rows of tubes, and in which the header means provides for flow of the fluid being heated sequentially through tubes of a lower row and thereafter through tubes of an upper row.

8. A method for heating a fluid by means of a bundle of generally horizontal tubes with external fins lying in generally upright planes, comprising effecting flow of said fluid through the inside of said tubes, effecting forced flow of hot products of combustion of gaseous fuel and air in a downward direction generally paralleling the planes of the fins substantially throughout the length of the tubes and in external contact with the finned tubes, and establishing conditions of temperature and rates of flow of said fluid and of said products of combustion providing for cooling of the products of combustion to a temperature below the dew point before delivery of the products of combustion from said tube bundle.

9. Heat transfer equipment comprising a combustion chamber, means for introducing a mixture of gaseous fuel and air into an upper region of the combustion chamber, a group of spaced externally finned tubes in a lower region of the combustion chamber, the tubes being arranged in a plurality of spaced superimposed planes, header means providing for flow of a fluid to be heated serially first through tubes in a lower plane and then through tubes in an upper plane, an exhaust manifold below the tubes for receiving gaseous products of combustion and having a discharge opening for delivery of gaseous products of combustion, and means establishing a flow of the mixture of fuel and air in a path extended downwardly through the combustion chamber and providing for delivery of products of combustion downwardly between the tubes substantially throughout the length thereof and into the manifold, the tubes being extended transversely of the path of flow of the products of combustion with the tube fins lying in planes generally paralleling said path of flow substantially throughout the length of the tubes.

10. Equipment as defined in claim 9 in which the header means includes an inlet header with which adjacent ends of the tubes lying in the lowermost plane communicate, and in which the header means further includes an outlet header with which the adjacent ends of the tubes in the uppermost plane communicate.

* * * * *